United States Patent
Shirai et al.

(10) Patent No.: US 7,242,952 B2
(45) Date of Patent: Jul. 10, 2007

(54) PORTABLE TERMINAL DEVICE AND METHOD OF GENERATING CALL SOUND

(75) Inventors: Katsuya Shirai, Kanagawa (JP); Yoichiro Sako, Tokyo (JP); Toshiro Terauchi, Tokyo (JP); Makoto Inoue, Kanagawa (JP); Yasushi Miyajima, Kanagawa (JP); Kenichi Makino, Kanagawa (JP); Motoyuki Takai, Tokyo (JP); Akiko Inoue, Saitama (JP)

(73) Assignee: Sony Corporation (JP)

( * ) Notice: Subject to any disclaimer, the term of this patent is extended or adjusted under 35 U.S.C. 154(b) by 239 days.

(21) Appl. No.: 10/900,811

(22) Filed: Jul. 27, 2004

(65) Prior Publication Data
US 2005/0043009 A1    Feb. 24, 2005

(30) Foreign Application Priority Data
Aug. 4, 2003    (JP) ............................ P2003-286056

(51) Int. Cl.
*H04B 1/138* (2006.01)
*H04M 11/04* (2006.01)
(52) U.S. Cl. .................................. 455/467; 455/404.1
(58) Field of Classification Search ................ 455/567, 455/404.1
See application file for complete search history.

(56) References Cited

U.S. PATENT DOCUMENTS 6,408,187 B1    6/2002  Merriam ..................... 455/458
6,798,898 B1 *  9/2004  Matsuda et al. ............ 382/128
2001/0014616 A1 * 8/2001  Matsuda et al. ............ 455/567
2002/0076033 A1    6/2002  Baweja et al. ......... 379/373.01
2002/0132616 A1    9/2002  Ross et al. .................. 455/419
2003/0045274 A1 * 3/2003  Nishitani .................... 455/414
2005/0207574 A1 * 9/2005  Pitz et al. ..................... 380/46

FOREIGN PATENT DOCUMENTS

| EP | 1263193 A2 | 12/2002 |
| EP | 1276307 A1 | 1/2003 |
| EP | 1316877 A1 | 6/2003 |
| EP | 1379064 A2 | 1/2004 |
| GB | 2308038 A | 6/1997 |
| JP | 2003-051865 | 2/2003 |

* cited by examiner

*Primary Examiner*—Nick Corsaro
*Assistant Examiner*—Ibrahim Khan
(74) *Attorney, Agent, or Firm*—Lerner, David, Littenberg, Krumholz & Mentlik, LLP

(57) ABSTRACT

Bio-information sensors acquire bio-information about a user, and environmental condition sensors acquire environmental information about the user. A call-sound generating unit generates audio data from the bio-information and the environmental information, and the audio data is recorded in a ROM. Upon detecting a call signal transmitted from a base station, a CPU causes the call-sound generating unit to read the audio data. The CPU causes the call-sound generating unit to supply the audio data to a speaker that generates the sound from the audio data.

10 Claims, 6 Drawing Sheets

| CATEGORY | SOUND-DATA ID |
|---|---|
| TO RELAX THE USER | B23014002 |
| | B23019752 |
| | B232D4892 |
| | E20011902 |
| TO ELATE THE USER | B230T2674 |
| | D230Q5465 |
| | D00012697 |
| | D230Q6578 |
| TO MAKE THE USER SLEEPY | L522T7684 |
| | L555T8796 |
| | L567T9876 |
| | L578T6578 |
| | M222P3332 |
| ⋮ | ⋮ |

FIG.3

| NUMBER | SOUND-DATA ID |
|---|---|
| 0001 | B23I4002 |
| 0002 | B23I9752 |
| 0003 | B232D4892 |
| 0004 | E20I1902 |
| 0005 | B230T2674 |
| 0006 | D230Q5465 |
| 0007 | D00I2697 |
| 0008 | D230Q6578 |
| 0009 | L522T7684 |
| 0010 | L555T8796 |
| 0012 | L567T9876 |
| 0011 | L578T6578 |
| 0012 | M222P3332 |
| ⋮ | ⋮ |

FIG.4

PORTABLE TERMINAL DEVICE AND METHOD OF GENERATING CALL SOUND

BACKGROUND OF THE INVENTION

1. Field of the Invention

The present invention relates to a portable terminal device and a method of informing the user of the arrival of calls. More particularly, the invention relates to a portable terminal device that waits for signals from any external network and informs the user of the arrival of the signals, and also to a method of informing the user of the arrival of calls.

This application claims priority of Japanese Patent Application No. 2003-286056, filed on Aug. 4, 2003, the entirety of which is incorporated by reference herein.

2. Description of the Related Art

Conventional portable tar devices, such as mobile telephones and PDAs, generate call sound, informing the users of the arrival of calls or mails. The audio data for the call sound, which represents either music or mimetic sound, is recorded in a memory such as a ROM incorporated in the conventional portable terminal device. A part of the audio data recorded in the memory is designated as data that represents the call sound. To change the call sound to another one, the user manually selects another part of the audio data and sets it as the data representing the new call sound (see Jpn. Pat Appln. Laid-Open Publication No. 15-051865).

With the conventional portable terminal device, the user cannot help but select one of a few audio data, as data representing the call sound. In other words, the user can use only a small part of the large audio data recorded in the memory. The same also holds true of the video data stored in the terminal device. Only a part of the video data is used to represent the call-arrival image or the call-wait image on the display provided on the portable terminal device.

SUMMARY OF THE INVENTION

The present invention has been made in view of the foregoing. The invention relates to a portable terminal device that automatically generates call sound, a portable terminal device that automatically displays a call-arrival image, and a method of informing the arrival of calls, which automatically change the call sound or the call-arrival image to another.

In a portable terminal device according to the invention, the measuring means acquires bio-information and/or environmental information about the user. The audio-data generating means generates audio data from the bio-information and/or environmental information. When a call signal arrives from an external network, the audio data is converted into sound. Hence, the portable terminal device can generates various call sounds in accordance with changes in the bio-information and/or environmental information.

In another portable terminal device according to the invention, the measuring means acquires the bio-information and/or environmental information about the user. The audio-data generating means generates video data from the bio-information and/or environmental information. The display means displays the image represented by the video data. Thus, this portable terminal device can display various call-arrival images and various call-wait images, in accordance with changes in the bio-information and/or environmental information.

In the present invention, the call sound is generated on the basis of the bio-information and/or environmental information about the user. Hence, the call sound can be automatically changed. No time is required to update the call sound.

Since the call sound is generated on the basis of the bio-information and/or environmental information about the user, it can be one desirable for the physical and mental conditions of the user.

Further, since the portable terminal device has bio-information sensors, the bio-information can be updated only if the user periodically operates the portable terminal device. The user need not spend time to acquire the bio-information.

A portable terminal device according to the invention has bio-information sensors and environmental condition sensors. Audio data is generated from the bio-information obtained by the bio-information sensors. Video data is generated from the environmental information obtained by the environmental condition sensors. The audio data and the video data are recorded in the recording unit. Any one of these data is output when the terminal receives a call signal, or a trigger signal, from a base station.

BRIEF DESCRIPTION OF THE DRAWINGS

FIG. 3 is a table representing the relation between the audio data IDs and various psychological effects;

FIG. 4 is a table showing the relation between the audio data IDs and the numbers;

DETAILED DESCRIPTION OF THE PREFERRED EMBODIMENTS

A portable terminal device 1 according to the present invention will be described, with reference to the accompanying drawings. The portable terminal device 1 acquires the bio-information and environmental data about the user. It can generate call sound in accordance with the bio-information and environmental data. Since the bio-information and environmental data keeps changing, the call sound can be changed always.

Figure 1:
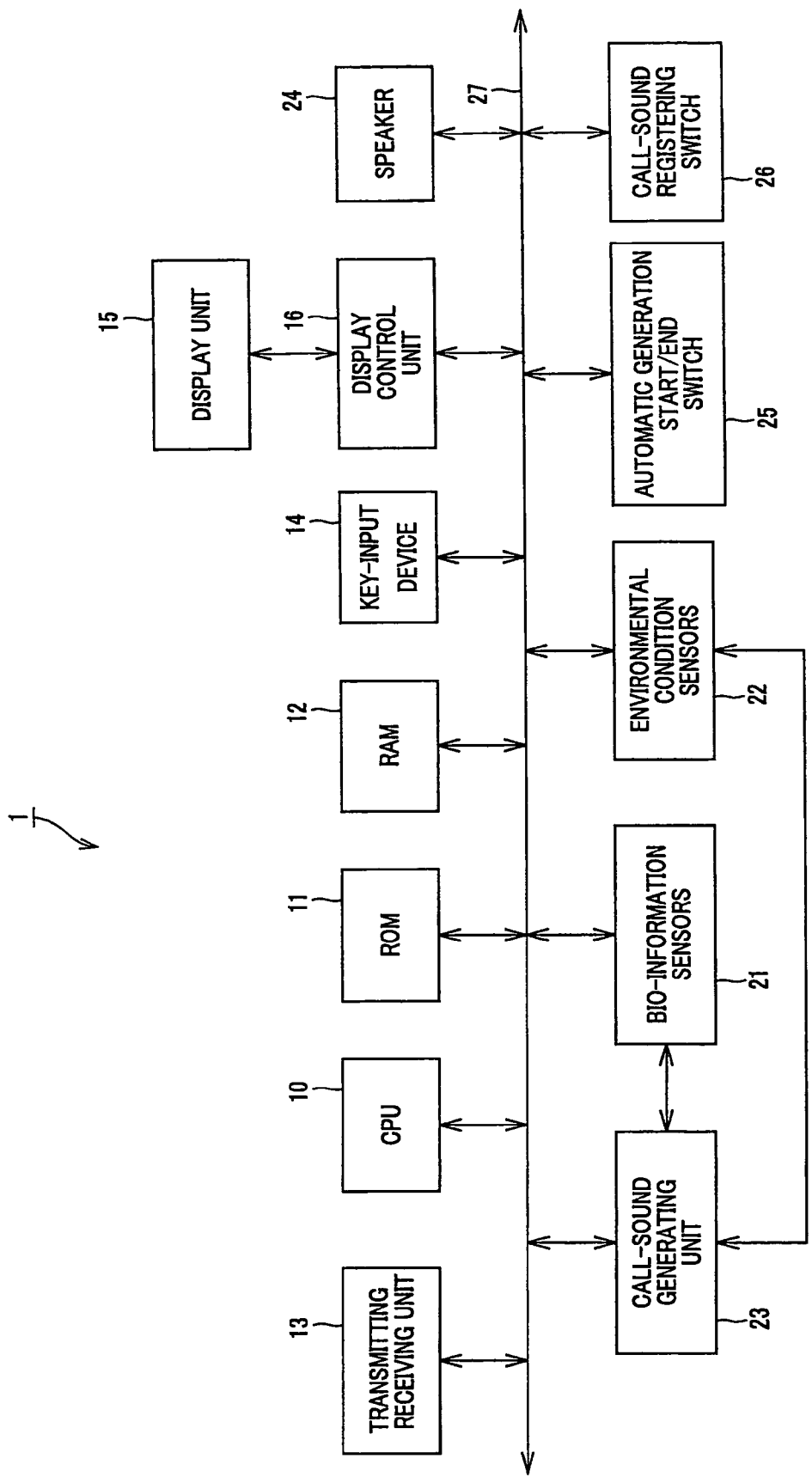
FIG. 1 is a block diagram showing a portable terminal device according to the present invention.

More specifically, the portable terminal device 1 is a mobile phone, a PDA (Personal Digital Assistant) or a PHS (Personal Handyphone System). As FIG. 1 shows, the device 1 comprises a CPU 10, a ROM 11, a RAM 12, a transmitting/receiving unit 13, a key-input device 14, a display unit 15, a display control unit 16, bio-information sensors 21, environmental condition sensors 22, a call-sound generating unit 23, a speaker 24, an automatic generation start/end switch 25, and a call-sound registering switch 26. All these components, but the display unit 15, are connected to a bus 27. The CPU 10 controls any other component of the portable terminal device 1. The ROM 11 stores programs and preset data. The RAM 12 serves as a random-access storage region. The transmitting/receiving unit 13 can receive call signals transmitted from base stations. The key-input device 14 inputs various data when it is operated by the user. The display unit 15 can display text data and image data. The display control unit 16 drives the display unit 15. The bio-information sensors 21 acquire various bio-information about the user. The environmental condition sensors 22 acquire various environmental data about the user. The call-sound generating unit 23 generates audio data from the bio-information and environmental data. The speaker 24 receives the audio data that the unit 23 has generated upon receipt of a call signal, and converts the audio data into call sound. The automatic generation start/end switch 25 starts and stops automatic generation of the call sound, when operated by the user. The call-sound registering switch 26 is operated to register the audio data representing any desired call sound.

Among the bio-information sensors are a rheometer, an electroencephalograph, an ophthalmograph, an electrocardiograph, a vibration gyroscope, an accelerometer, a muscle-sound meter, a skin-temperature sensor, a movement sensor, a skin-electroconductivity sensor, and a pulsometer. The rheometer applies infrared rays to the user, receives the rays reflected from the user and measures the blood flow rate in the brain, the oxygen concentration in the blood and the like. The electroencephalograph detects the brain waves such as α waves and β waves from the current flowing through the brain. The ophthalmograph is mounted on the head of the user and detects the vibration frequency of the eyes from changes of the voltage in the brain. The electrocardiograph determines the pulse rate from the current flowing from the heart muscle. The vibration gyroscope detects the movement of the chest and the breath rate from the angular velocity. The skin-temperature sensor measures the temperature of the user. The skin-electroconductivity sensor measures the perspiration from the electrical resistance of the skin. Having these bio-information sensors 21, the portable terminal device 1 can automatically acquire the bio-information about the user. Such bio-information may include a facial expression, a voice, a movement, a breath rate, a pulse rate, a heart rate, a perspiration, a temperature, brain waves, a cardiograph, a myoelectric, oxygen-in-blood saturation, skin-resistance, and/or a user view direction. As an example, the device 1 can measure the temperature and pulse rate of the user while the user is talking through it or writing an E-mail on it. Namely, the portable terminal device 1 acquires user's bio-information while the user is performing daily activities. Hence, the user needs to do nothing to detect his or her bio-information.

The environmental condition sensors 22 acquire the environmental data about the user. The environmental conditions are the user's position, the weather, the temperature, the humidity, the wind speed, the airflow, and the date. Among the environmental condition sensors 22 are a thermometer, an altitude meter, a barometer, and a hygrometer. The environmental data can be externally acquired. The portable terminal device 1 may be, for example, a mobile telephone. In this case, the device 1 can periodically acquire the environmental data from the nearest base station of the telephone company. The user's position may be acquired from the GPS (Global Positioning System).

The portable terminal device 1 may have only one of the bio-information sensors mentioned above and only one of the environmental condition sensors. Alternatively, the device 1 may have bio-information sensors or environmental condition sensors.

Figure 2:
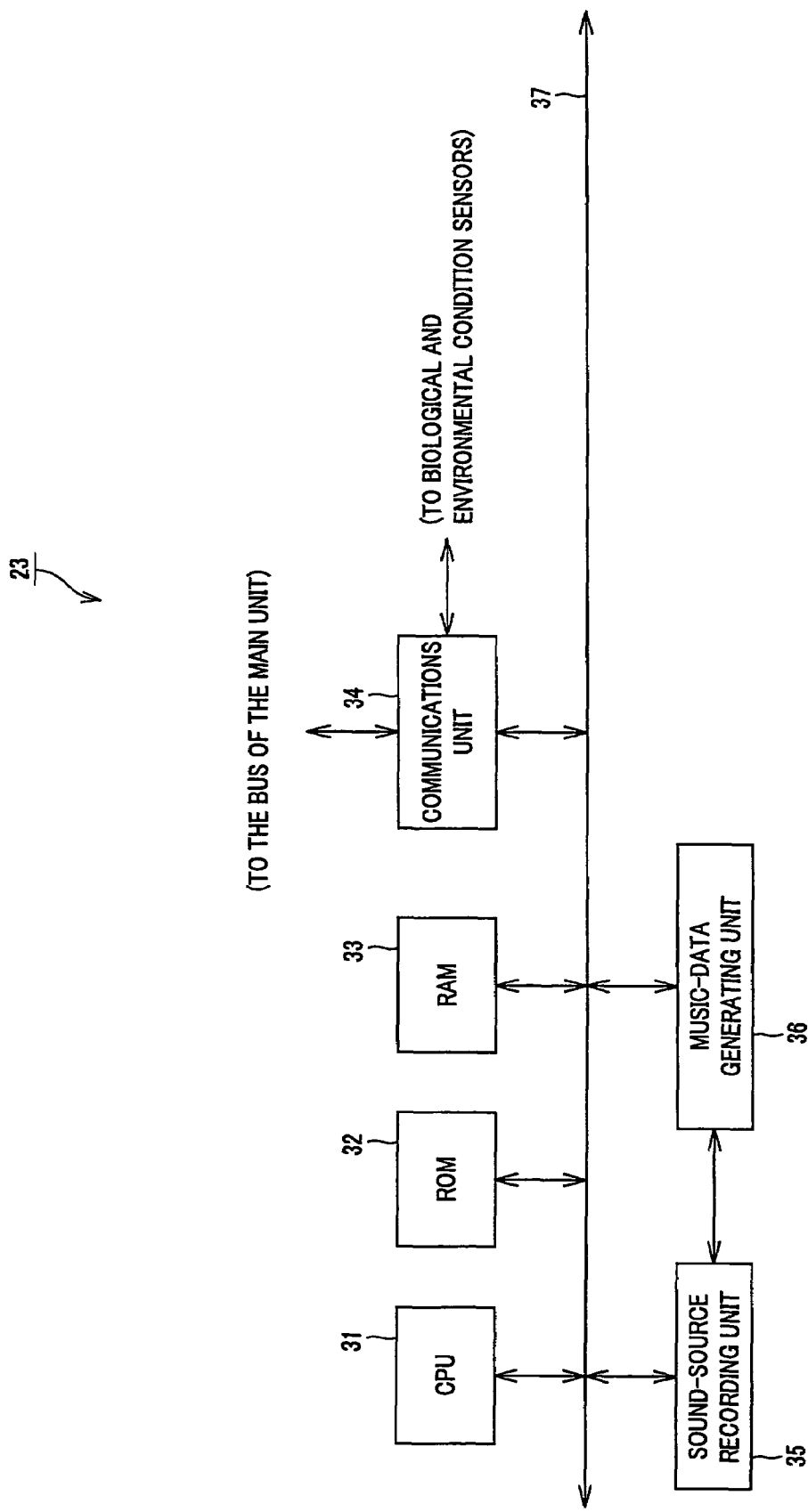
FIG. 2 is a block diagram of the call-sound generating unit provided in the portable terminal device shown in FIG. 1.

The call-sound generating unit 23 generates audio data from the bio-information and environmental data. As FIG. 2 shows, the call-sound generating unit 23 comprises a CPU 31, a ROM 32, a RAM 33, a communications unit 34, a sound-source recording unit 35, and a music-data generating unit 36. The CPU 31 controls the other components of the call-sound generating unit 23. The ROM 32 records a program for generating call sound. The RAM 33 serves as work region of the CPU 31. The communications unit 34 controls communication between the call-sound generating unit 23 and the bio-information sensors 21, the environmental condition sensors 22 and some other components of the portable terminal device 1. The sound-source recording unit 35 records the source of the call sound. The music-data generating unit 36 generates the audio data representing the call sound. The components 31, 32, 33, 34, 35 and 36 are connected to one another by a bus 37. The music-data generating unit 36 can generate the audio data in various methods. In the first method, various audio data is stored in the sound-source recording unit 35. One of these data is selected in accordance with the user's conditions. The user's conditions include the user's position, the user's physical condition, the user's emotional condition, the user's mental concentration and the like.

How one of these data is selected (in the first method) will be described. The user's emotional condition is determined from the pulse rate. The pulse rate is a parameter that indicates the emotion of man. It continuously changes at high frequency as long as man performs activities. While man is sleeping, the pulse rate is stable and changes but at low frequency. The pulse rate changes in a particular pattern. The pulse rate detected when man stays in normal emotional condition is called "specific pulse rate." When man is frightened or encountered by a stranger, his pulse rate jumps. Any change in the pulse rate shows man's emotional change. The call-sound generating unit 23 keeps measuring the user's pulse rate and chronically recorded, preparing a pulse-rate change pattern. Whenever the user's pulse greatly changes, it is determined that the user has just undergone an emotional change.

When a change in the user's emotional condition is detected, the music-data generating unit 36 selects one of the various audio data stored in the sound-source recording unit 35. The unit 36 may select audio data, as will be described with reference to FIG. 3. FIG. 3 is a table that represents the relation between the audio data IDs and various psychological effects that may work on the user. Among these psychological effects are those that make the user feel relaxed, elated and sleepy. If it is determined that the user is nervous, the audio data representing the sound that may help the user relax himself or herself.

The second method in which the music-data generating unit 36 generates audio data will be now explained. This method is to generate the audio data in accordance with the user's physical condition. The bio-information are parameters that indicate the physical condition of man. Hence, the physical condition of man can be determined from the bio-information, and audio data can be generated in accordance with man's physical condition thus determined. Man's temperature, pulse rate, breath rate and the like of man show his physical condition. Generally, the pulse rate during the sleep is high when man is in bad physical condition, greatly stressed and tired; and the breadth is shallow and its rate is high when man is greatly stressed or tired. Thus, the music data generating unit 36 acquires the user's temperature, pulse rate and breath rate and finds the user's average temperature, average pulse rate and average breath rate. The user's temperature, pulse rate and breath rate may not so different from the average values, which means that the user is in good physical condition. If this is the case, the unit 36 generates audio data representing call sound that the user likes to hear when he or she is in good physical condition. The user's temperature, pulse rate and breath rate may be much different from the average values. In this case, the unit 36 generates audio data representing call sound that the user likes to hear when he or she is in bad physical condition. This audio data represents, for example, slow-tempo music.

The third method in which the music-data generating unit 36 generates audio data will be described. In the third method, the audio data is generated in accordance with the changes in the bio-information and environmental data about the user. The term "changes" means deviations from average values. These changes are said to sooth man's mind, as the sound that a flowing stream makes and the rhythm that classical music has. The music-data generating unit 36 determines the rhythm for the call sound on the basis of the changes in the bio-information and environmental data, and generates audio data that represents the call sound that make the user feel good. The "changes" can drive not only from the pulse rate, but also from the other bio-information (e.g., breath rate and temperature), and some environmental data (e.g., airflow and temperature).

The fourth method in which the music-data generating unit 36 generates audio data will be described. In the fourth method, the audio data representing the call sound is automatically changed, by using the bio-information and environmental data as seed of random number. In this method, serial numbers are assigned to the audio data as is illustrated in FIG. 4. Random numbers are generated from the seed, i.e., the bio-information and environmental data. The unit 36 selects one of the audio data identified by the random number. Hence, the music-data generating unit 36 can generate different sound data each time it should. The user can therefore enjoy hearing a different call sound each time the portable terminal device 1 receives a call without the necessity of operating the device 1 to change the call sound to another.

The fifth method in which the music-data generating unit 36 generates audio data will be explained. In the fifth method, the unit 36 automatically generates the data representing the music written in MIDI (Musical Instruments Digital Interface) notes. Like ordinary portable terminal devices, the terminal device 1 stores various call sounds data that is described in the MIDI notes. Each MIDI note represents fundamental parameters of one sound. These parameters are tone color (e.g., piano tone, guitar tone, etc.), pitch called "key," intensity called "velocity," magnitude called "volume" and length called "duration." These parameters are mathematical values and can, therefore, be obtained by using appropriate equations. The music-data generating unit 36 acquires the bio-information and environmental data and converts them into sound parameters in accordance with a prescribed rule. The unit 36 generates new audio data from one sound parameters. Alternatively, the unit 36 may change the parameter of any sound already selected, and may output this parameter as new audio data.

The sixth method in which the music-data generating unit 36 generates audio data will be described. In the sixth method, the unit 36 selects one of the audio data in accordance with whether the user concentrates his or her mind on listing to music, not on the operation of the portable terminal device. When man concentrates himself or herself on listening to music, he or she is relaxed, moving little and his and her respiration and pulse waves are stable, or moves to the music rhythm and his or her breath rate and pulse rate change with the changes in the music rhythm. The movement sensor, such as the vibration gyroscope, and the pulsometer, both incorporated in the portable terminal device 1, detect the movement and pulse waves of the user. Further, the microphone (not shown) provided on the device 1 detects the music. The correlation between the music and the movement is obtained, determining how much the user is absorbed in listening to the music. If the user is much absorbed in listening to the music, the music-data generating unit 36 selects audio data that represents music that differs in rhythm and tempo from the music the user is enjoying. The music represented by the audio data selected is reproduced in a relatively large volume so that the user may notice a call has just arrived.

Figure 5:
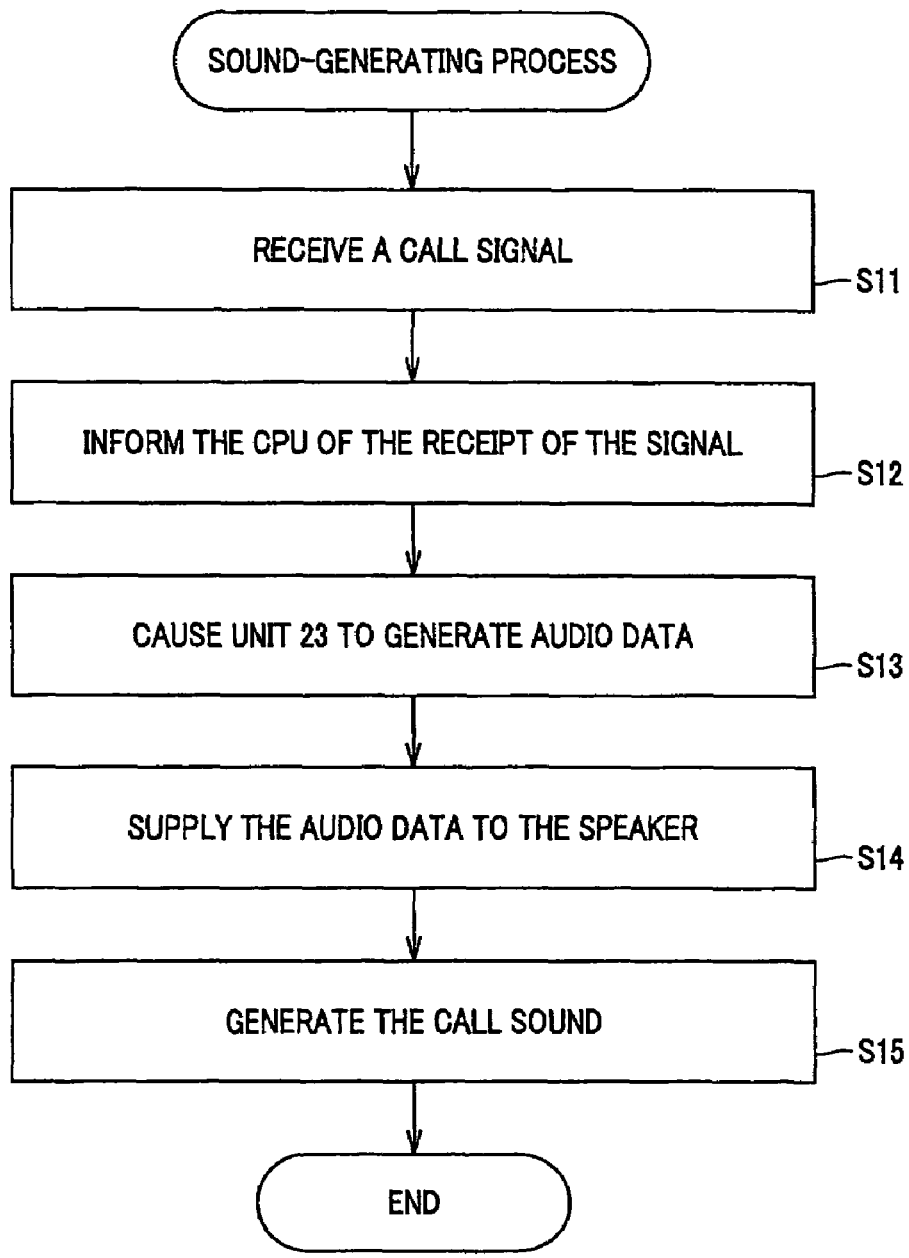
FIG. 5 is a flowchart explaining the sequence of generating the call sound.

When triggered by a call signal, the speaker 24 (FIG. 1) generate call sound from the audio data selected. How the call sound is generated will be described, with reference to the flowchart of FIG. 5. When someone calls the portable terminal device 1, the base station that receives this call transmits a call signal to the portable terminal device 1 (Step S11). In the device 1, the transmitting/receiving unit 13 informs the CPU 10 of the arrival of the call signal (Step S12). The CPU 10 causes the call-sound generating unit 23 to generate audio data (Step S13). Note that the base station may transmit a call signal to the device 1 to transmit an E-mail or data to the device 1. In this case, the CPU 10 causes the unit 23 to generate the audio data assigned to the type of the call signal transmitted to the portable terminal device 1.

The call-sound generating unit 23 outputs the audio data it has generated as instructed by the CPU 10, to the speaker 24 (Step S14). The audio data may be stored in the RAM 12. In the speaker 24, the vibrating plate is vibrated, whereby call sound is generated (Step S15). Thus, the call-sound generating unit 23 generates audio data and outputs the data to the speaker 24 every time a call signal arrives at the portable terminal device 1.

The call-sound generating unit 23 can therefore give different call sounds to the user. The user has no option for any other call sounds. To enable the user to hear a desired call sound when a call arrives at the terminal 1, the device 1 has the automatic generation start/end switch 25 and the call-sound registering switch 26.

The user may operate the call-sound registering switch 26 to register the audio data representing the call sound he or she likes, in the specified region of the RAM 12. When the user operates the switch 26 while the speaker 24 is generating any call sound, the audio data representing this call sound is stored in the specified region of the RAM 12. Similarly, when the user selects one of the audio data hitherto supplied to the speaker 24, the audio data selected is stored in the RAM 12. Hence, the audio data representing any call sound, which is determined from the bio-information and environmental data, can be registered in the RAM 12, though this call sound may not be generated by the speaker 24 again because the user's physical and environmental conditions are ceaselessly changing.

The user may operate the automatic generation start/end switch 25, inhibiting the call-sound generating unit 23 from automatically generating audio data representing call sounds. In this case, any audio data registered in the specified region of the RAM 12 can be used. That is, the speaker 24 can generate a call sound again, even if this sound has been determined based on the bio-information and environmental data. The automatic generation start/end switch 25 is a toggle switch. When depressed again, the switch 25 causes the call-sound generating unit 23 to generate audio data automatically in accordance with the bio-information and environmental data.

Figure 6:
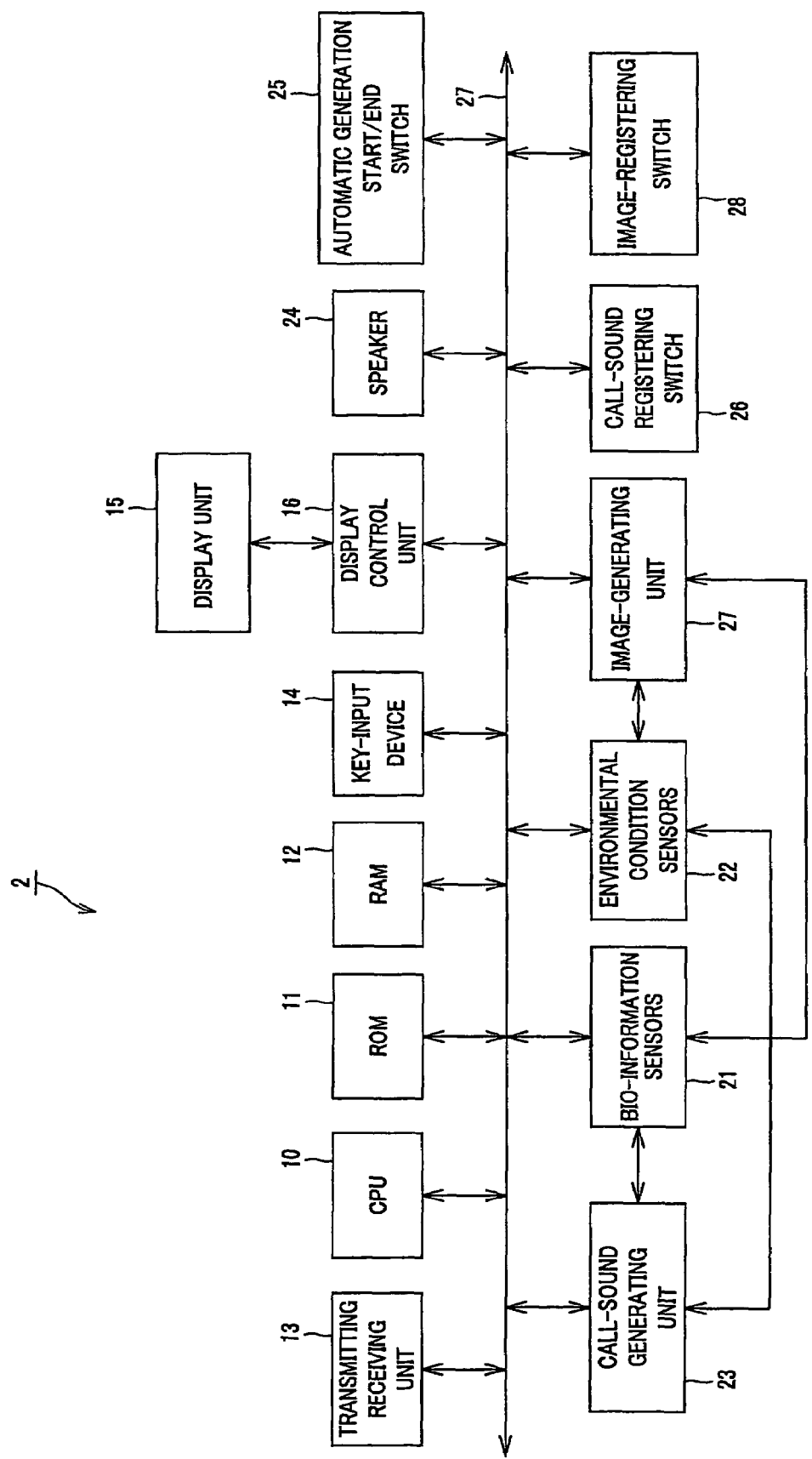
FIG. 6 is a block diagram depicting a portable terminal device that automatically generates an image.

The present invention can be applied to a call arrival image or a call-wait image. FIG. 6 is block diagram showing a portable terminal device 2 which generates a call-arrival image. As FIG. 6 shows, the terminal 2 has an image-generating unit 27 which generates video data that represents a call-arrival image and a call-wait image. The unit 27 generates video data in the same way the call-sound generating unit 23 generates call-sound data. To be more specific, the image-generating unit 27 determines the user's conditions from the bio-information and environmental data and generates video data representing a call-arrival image. The unit 27 therefore generates audio data representing a call-arrival image in accordance with the user's conditions. Alternatively, the unit 27 may generate a different call-arrival image when the user's physical and environmental conditions change. Thus, the call-arrival image can be automatically updated.

The present invention is not limited to the embodiments described above. The invention includes various changes and modifications that do not depart from the subject matter of the invention, which is a portable terminal device 1 having bio-information sensors.

What is claimed is:

1. A portable terminal device having a communications function, said portable terminal device comprising:
    measuring means for acquiring at least bio-information about a user;
    detecting means for detecting a change between the acquired bio-information and normal bio-information of the user;
    audio-data generating means for determining at least one of a physical condition, an emotional condition, or a mental concentration of the user in accordance with the change of bio-information detected by the detecting means and for generating audio data in accordance with the determined one or ones of the physical condition, the emotional condition, or the mental concentration;
    call-detecting means for waiting for a call signal supplied from an external network and for detecting the call signal upon arrival at the portable terminal device; and
    call-sound generating means for converting the audio data into sound, when the call signal is detected by the call-detecting means.

2. The portable terminal device according to claim 1, in which the measuring means further acquires environmental information about the user, and the audio-data generating means generates predetermined audio data in accordance with the environmental information and the determined one or ones of the physical condition, the emotional condition, or the mental concentration.

3. The portable terminal device according to claim 2, further comprising audio-data storing means for storing a plurality of audio data, and in which the audio-data generating means selects one of the plurality of audio data stored in the audio-data storing means.

4. The portable terminal device according to claim 3, wherein the audio-data generating means uses the bio-information and/or the environmental information as a seed for generating a random number, and selects the audio data stored in the audio-data storing means in accordance with the generated random number.

5. The portable terminal device according to claim 2, wherein the audio-data generating means generates note data representing a tone color, a pitch, a duration and a volume of sound, in accordance with the bio-information and/or the environmental information.

6. The portable terminal device according to claim 5, wherein the note data is described in Musical Instruments Digital Interface (MIDI) notes.

7. The portable terminal device according to claim 1, wherein the measuring means measures at least one of a facial expression, a voice, a movement, a breath rate, a pulse rate, a heart rate, a perspiration, a temperature, brain waves, a cardiograph, a myoelectric, oxygen-in-blood saturation, skin-resistance, or a user view direction.

8. A method of notifying a call arrival, comprising the steps of:
    acquiring at least bio-information about a user;
    detecting a change between the acquired bio-information and normal bio-information of the user;
    determining at least one of a physical condition, an emotional condition, or a mental concentration of the user in accordance with the detected change of bio-information;
    generating audio data in accordance with the determined one or ones of the physical condition, the emotional condition, or the mental concentration; and
    converting the audio data to sound when a call arrives from an external network.

9. A portable terminal device having a communications function, said portable terminal device comprising:
    measuring means for acquiring at least bio-information about a user;
    detecting means for detecting a change between the acquired bio-information and normal bio-information of the user
    audio-data generating means for determining at least one of an emotional condition or a mental concentration of the user in accordance with the change of bio-information detected by the detecting means and for generating audio data in accordance with the determined one or ones of the the emotional condition or the mental concentration;
    call-detecting means for waiting for a call signal supplied from an external network and for detecting the call signal upon arrival at the portable terminal device; and
    call-sound generating means for converting the audio data into sound, when the call signal is detected by the call-detecting means.

10. The portable terminal device according to claim 9, in which the emotional condition includes a change in pulse rate of the user.

* * * * *

UNITED STATES PATENT AND TRADEMARK OFFICE
CERTIFICATE OF CORRECTION

| | |
|---|---|
| PATENT NO. | : 7,242,952 B2 |
| APPLICATION NO. | : 10/900811 |
| DATED | : July 10, 2007 |
| INVENTOR(S) | : Katsuya Shirai et al. |

It is certified that error appears in the above-identified patent and that said Letters Patent is hereby corrected as shown below:

In Column 1, Line 17, "tar" should read --terminal--; and

In Column 6, Line 10, "generate" should read --generates--.

Signed and Sealed this

Twelfth Day of August, 2008

JON W. DUDAS
*Director of the United States Patent and Trademark Office*